(12) United States Patent
Marugami et al.

(10) Patent No.: US 11,283,249 B2
(45) Date of Patent: Mar. 22, 2022

(54) SHEATHING MEMBER AND WIRE HARNESS

(71) Applicant: Yazaki Corporation, Tokyo (JP)

(72) Inventors: Shin Marugami, Shizuoka (JP); Atomu Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/110,231

(22) Filed: Dec. 2, 2020

(65) Prior Publication Data

US 2021/0175695 A1 Jun. 10, 2021

(30) Foreign Application Priority Data

Dec. 5, 2019 (JP) .............................. JP2019-220241

(51) Int. Cl.
*H02G 3/04* (2006.01)
*B60R 16/02* (2006.01)

(52) U.S. Cl.
CPC ........ *H02G 3/0437* (2013.01); *B60R 16/0215* (2013.01)

(58) Field of Classification Search
CPC ...... H02G 3/0468; H02G 3/0406; H02G 3/32; H02G 3/0481; H02G 3/22; H02G 11/00; H02G 3/0691; H02G 15/043; H02G 3/0462; H02G 3/0487; H02G 3/083; H02G 3/0418; H02G 3/088; H02G 15/003; H02G 15/013; H02G 3/0475; H02G 3/263; H02G 3/34; H02G 15/04; H02G 15/117; H02G 15/34; H02G 1/14; H02G 3/06; H02G 3/081; H02G 3/30; H02G 5/066; H02G 9/10;
(Continued)

(56) References Cited

U.S. PATENT DOCUMENTS 4,140,422 A * 2/1979 Crumpler, Jr ......... F16L 37/248
405/49
4,758,023 A * 7/1988 Vermillion ............ F16L 37/252
285/7
(Continued)

FOREIGN PATENT DOCUMENTS

DE 19808980 C1 9/1999
EP 1286099 A2 2/2003
(Continued)

*Primary Examiner* — William H. Mayo, III
*Assistant Examiner* — Krystal Robinson
(74) *Attorney, Agent, or Firm* — Kenealy Vaidya LLP

(57) ABSTRACT

A sheathing member includes: a plurality of tubular units into each of which a wiring material having conductivity is inserted; and a connecting unit configured to connect respective open ends of the plurality of tubular units with each other, in which the tubular units respectively include lap portions in which the open ends to be connected overlap each other along a diameter direction, and the connecting unit includes a projection that is provided in the lap portion of one of the tubular units to be connected and projects along the diameter direction, and a groove unit that is provided in the lap portion of the other of the tubular units to be connected, includes a first groove extending from the open end along an axis direction and a second groove extending from an axially-extended end of the first groove along a circumference direction, and has the projection passed therethrough.

4 Claims, 11 Drawing Sheets

(58) Field of Classification Search
CPC .. H02G 11/006; H02G 15/007; H02G 15/113; H02G 15/115; H02G 1/081; H02G 1/145; H02G 1/16; H02G 3/00; H02G 3/02; H02G 3/04; H02G 3/0412; H02G 3/0443; H02G 3/0616; H02G 3/0633; H02G 3/0658; H02G 3/0666; H02G 3/123; H02G 3/126; H02G 3/18; H02G 3/185; H02G 3/20; H02G 3/26; H02G 3/38; H02G 5/00; H02G 5/025; H02G 5/068; H02G 9/065; H02G 9/12; H01B 7/0045; H01B 12/16; H01B 13/06; H01B 7/282; H01B 7/2825; H01B 7/295; H01B 11/06; H01B 11/08; H01B 11/18; H01B 11/1895; H01B 11/22; H01B 13/0009; H01B 13/004; H01B 13/012; H01B 13/01209; H01B 13/01263; H01B 17/00; H01B 17/14; H01B 17/16; H01B 17/583; H01B 1/20; H01B 3/30; H01B 3/441; H01B 3/443; H01B 3/445; H01B 7/009; H01B 7/02; H01B 7/16; H01B 7/17; H01B 7/1815; H01B 7/1845; H01B 7/185; H01B 7/28; H01B 7/292; H01B 7/328; H01B 9/006; H01B 9/04

See application file for complete search history.

(56) References Cited

U.S. PATENT DOCUMENTS

| | | | | |
|---|---|---|---|---|
| 4,836,208 A | * | 6/1989 | Ulbrich | A61B 5/288 600/376 |
| 5,463,187 A | * | 10/1995 | Battle | F16L 7/00 138/111 |
| 2003/0034651 A1 | | 2/2003 | Neubauer et al. | |
| 2007/0025061 A1 | * | 2/2007 | Kogure | H02G 3/0468 361/437 |
| 2013/0068522 A1 | * | 3/2013 | Ogawa | B60R 16/0215 174/72 A |
| 2016/0238166 A1 | | 8/2016 | Fukuda et al. | |
| 2019/0308571 A1 | | 10/2019 | Hagi et al. | |

FOREIGN PATENT DOCUMENTS

| | | |
|---|---|---|
| EP | 2882054 A1 | 6/2015 |
| FR | 2742518 A1 | 6/1997 |
| JP | S59-171288 U | 11/1984 |
| JP | 2015-89143 A | 5/2015 |
| JP | 2016-152714 A | 8/2016 |
| WO | 2012/077654 A1 | 6/2012 |
| WO | 2016/029270 A1 | 3/2016 |
| WO | 2018/043542 A1 | 3/2018 |

* cited by examiner

SHEATHING MEMBER AND WIRE HARNESS

CROSS-REFERENCE TO RELATED APPLICATION(S)

The present application claims priority to and incorporates by reference the entire contents of Japanese Patent Application No. 2019-220241 filed in Japan on Dec. 5, 2019.

BACKGROUND OF THE INVENTION

1. Field of the Invention

The present invention relates to a sheathing member and a wire harness.

2. Description of the Related Art

Some electric wires laid in a vehicle such as an automobile are protected by corrugated tubes that are sheathing members. For example, Japanese Patent Application Laid-open No. 2016-152714 describes a structure of a corrugated tube in which peaks and troughs of bellows sequentially alternate along a tube axis direction.

Meanwhile, in recent years, as the number of electronic components increases, electric wires have more various forms regarding the number or lengths thereof. Then, there is a need to prepare many sheathing members different in form such as length, to be suited to each setting pattern of electric wires to be laid.

However, sheathing members in different forms can be used only in a specific setting location in some cases, and thus can be put only to a limited use. Further, preparing many sheathing members in different forms causes a concern about an increase in cost for management of manufacture, transportation, and the like.

SUMMARY OF THE INVENTION

The present invention has been made in view of the above-described situations, and it is an object to provide a sheathing member and a wire harness that can improve versatility.

In order to solve the above mentioned problem and achieve the object, a sheathing member according to one aspect of the present invention includes a plurality of tubular units into each of which a wiring material having conductivity is inserted; and a connecting unit configured to connect respective open ends of the tubular units with each other, wherein the tubular units respectively include lap portions in which the open ends to be connected overlap each other along a diameter direction, and the connecting unit includes a projection that is provided in the lap portion of one of the tubular units to be connected and projects along the diameter direction, and a groove unit through which the projection is passed, the groove unit being provided in the lap portion of the other of the tubular units to be connected and including a first groove extending from the open end along an axis direction and a second groove extending from an axially-extended end of the first groove along a circumference direction.

According to another aspect of the present invention, in the sheathing member, it is preferable that the groove unit of the connecting unit is provided as a slit cut through the lap portion of the other of the tubular units to be connected.

According to still another aspect of the present invention, in the sheathing member, it is preferable that the groove unit of the connecting unit is provided as a recessed groove formed within a thickness of the lap portion of the other of the tubular units to be connected.

According to still another aspect of the present invention, in the sheathing member, it is preferable that the groove unit of the connecting unit is provided as a projecting groove that is formed in a portion projecting along the diameter direction in the lap portion of the other of the tubular units to be connected.

According to still another aspect of the present invention, in the sheathing member, it is preferable that the connecting unit further includes a locking unit that retains the projection in the second groove of the groove unit.

According to still another aspect of the present invention, in the sheathing member, it is preferable that the connecting unit is provided in each of plural places along a circumference direction in the lap portion.

According to still another aspect of the present invention, in the sheathing member, it is preferable that the plurality of tubular units include a path-restricting tubular unit that has higher stiffness than that of the wiring material and restricts a wiring path of the wiring material, and a deformation-allowing tubular unit that has greater flexibility than the path-restricting tubular unit and allows deformation of the wiring material.

In order to achieve the object, a wire harness according to still another aspect of the present invention includes a wiring material having conductivity; and a sheathing member with which the wiring material is sheathed, wherein the sheathing member includes: a plurality of tubular units into each of which the wiring material is inserted; and a connecting unit configured to connect respective open ends of the plurality of tubular units with each other, the tubular units respectively include lap portions in which the open ends to be connected overlap each other along a diameter direction, and the connecting unit includes a projection that is provided in the lap portion of one of the tubular units to be connected and projects along the diameter direction, and a groove unit through which the projection is passed, the groove unit being provided in the lap portion of the other of the tubular units to be connected and including a first groove extending from the open end along an axis direction and a second groove extending from an axially-extended end of the first groove along a circumference direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of the present invention will be described in detail with reference to the drawings. It is noted that the embodiments do not limit the present invention in any way. Further, composing elements in the embodiments described below include elements replaceable or easily replaced by a person skilled in the art, or elements substantially identical thereto.

Figure 1:
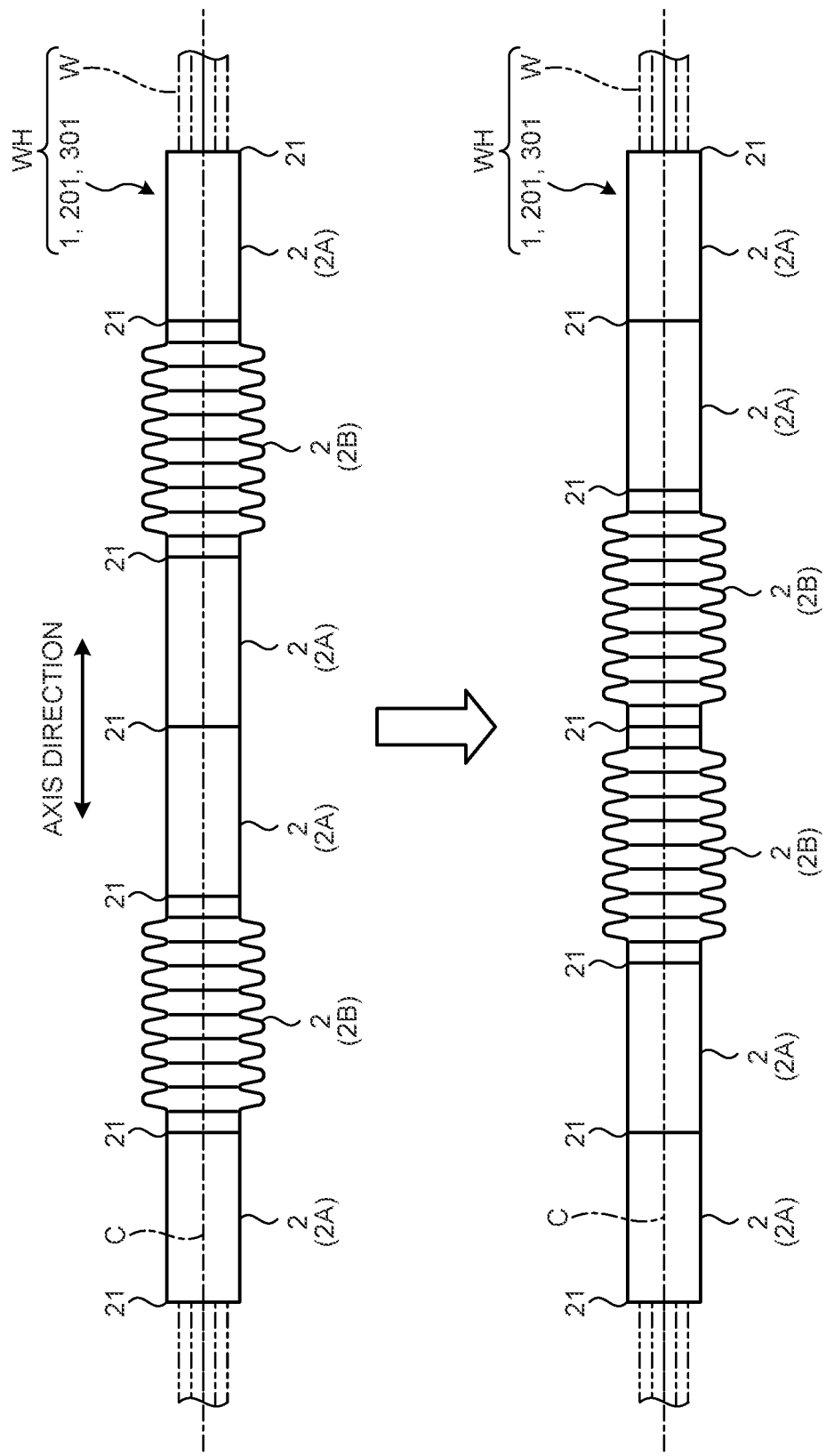
FIG. 1 is a view of a configuration of a sheathing member and a wire harness according to embodiments.

FIG. 1 is a view of a configuration of a sheathing member and a wire harness according to the embodiments. A sheathing member 1, 201, or 301 is incorporated in a wire harness WH mounted in a vehicle such as an automobile. Here, the sheathing member 1 corresponds to a later-described first embodiment, the sheathing member 201 corresponds to a later-described second embodiment, and the sheathing member 301 corresponds to a later-described third embodiment. The wire harness WH, which is used to connect devices mounted in a vehicle, for example, is a collective component formed of a plurality of wiring materials W in a bundle used for power supply or signal communication. The plurality of wiring materials W are connected with the devices via connectors or the like. The wire harness WH includes the wiring material W having conductivity and the sheathing member 1, 201, or 301 with which the wiring material W inserted thereinto is sheathed. The wiring material W includes a metal rod, an electric wire, a bundle of electric wires, and the like, for example. A metal rod is a conductive rod-shaped material having an outer surface covered with an insulating covering unit. An electric wire is a conductor (core wire) that is formed of a plurality of conductive metal strands and has an outer surface covered with an insulating covering unit. In the wire harness WH, the plurality of wiring materials W are tied in a bundle and collected, and the wiring materials W in a bundle are inserted into the sheathing member 1, 201, or 301. The wire harness WH may further include a grommet, a protector, a fixture, an electrical connection box, and the like other than the above-described components.

The sheathing member 1, 201, or 301 of the present embodiments includes a plurality of tubular units 2 into each of which the wiring material W is inserted. Each of the tubular units 2 is formed in a tubular shape and the wiring material W is inserted into the inside. The plurality of tubular units 2 have respective open ends 21 connected with each other, and thus are continuous with each other along an axis direction that is a direction along which a central axis C of a tube extends, thereby forming the sheathing member 1, 201, or 301.

The plurality of tubular units 2 may include different kinds of tubular units. The term "kind" means a form of the tubular unit 2. For example, in the present embodiments, there are included a path-restricting tubular unit 2A and a deformation-allowing tubular unit 2B. The path-restricting tubular unit 2A is formed so as to have higher stiffness than that of the wiring material W to be inserted (or a bundle of the wiring materials W in a case where the wiring materials W in a bundle are inserted) and be hard enough to maintain a tubular shape, and serves to restrict a wiring path of the wiring material W (bundle of the wiring materials W). In FIG. 1, the path-restricting tubular unit 2A is illustrated in a form in which the central axis C is a straight line and linearly extends, and linearly restricts a wiring path of the wiring material W (bundle of the wiring materials W). Alternatively, though not clearly illustrated in the drawings, the path-restricting tubular unit 2A may be in a form in which the central axis C extends while bending, and may restrict a wiring path of the wiring material W (bundle of the wiring materials W) in a bending state. The deformation-allowing tubular unit 2B has greater flexibility than the path-restricting tubular unit 2A, is formed so that it can be freely bent and deformed, and serves to allow deformation of the wiring material W (bundle of the wiring materials W). In a case where the deformation-allowing tubular unit 2B has lower stiffness than that of the wiring material W (bundle of the wiring materials W), the deformation-allowing tubular unit 2B is bent and deformed, following bending deformation of the wiring material W (bundle of the wiring materials W), to allow deformation of the wiring material W (bundle of the wiring materials W). In a case where the deformation-allowing tubular unit 2B has higher stiffness than that of the wiring material W (bundle of the wiring materials W), the deformation-allowing tubular unit 2B restricts a wiring path of the wiring material W (bundle of the wiring materials W) while allowing deformation of the wiring material W (bundle of the wiring materials W). In FIG. 1, the deformation-allowing tubular unit 2B is illustrated in a form in which peaks and troughs of bellows sequentially alternate and are extendable so that the central axis C can be freely bent and deformed. Meanwhile, though not clearly illustrated in the drawings, the path-restricting tubular unit 2A may be provided with a universal joint at some midpoint along an axis direction and be in a form in which the central axis C can be freely bent and deformed. Additionally, though not clearly illustrated in the drawings, the kinds of the tubular units 2 are not limited to those described above, and the tubular unit 2 may be in a form with a different length, a form with a smaller or larger diameter, a form in which a section crossing the central axis C has an elliptic shape, a flat shape, a polygonal shape, or the like, other than a circular shape, or a form in which the open end 21 is bifurcated.

For example, as illustrated in FIG. 1, when the path-restricting tubular unit 2A and the deformation-allowing tubular unit 2B are combined and connected with each other, the sheathing member 1, 201, or 301 can restrict a wiring path of the wiring material W (bundle of the wiring materials W) with the path-restricting tubular unit 2A in part and can allow deformation of the wiring material W (bundle of the wiring materials W) with the deformation-allowing tubular unit 2B in part. Further, as illustrated in the upper side and the lower side of FIG. 1, in the sheathing member 1, 201, or 301, by changing a combination of the path-restricting tubular unit 2A and the deformation-allowing tubular unit 2B to be connected, it is possible to change positions where a wiring path of the wiring material W (bundle of the wiring materials W) is restricted and deformation is allowed. Additionally, all of the plurality of tubular units 2 to be connected may be of the same kind. For example, the path-restricting tubular unit 2A can be used as each of all the tubular units 2 to restrict a wiring path of the wiring material W (bundle of the wiring materials W), or the deformation-allowing tubular unit 2B can be used as each of all the tubular units 2 to allow deformation of the wiring material W (bundle of the wiring materials W).

Below, the embodiments discussing configurations of connection of the tubular units 2 (2A, 2B) forming the sheathing members 1, 201 and 301 will be described.

First Embodiment

Figure 2:
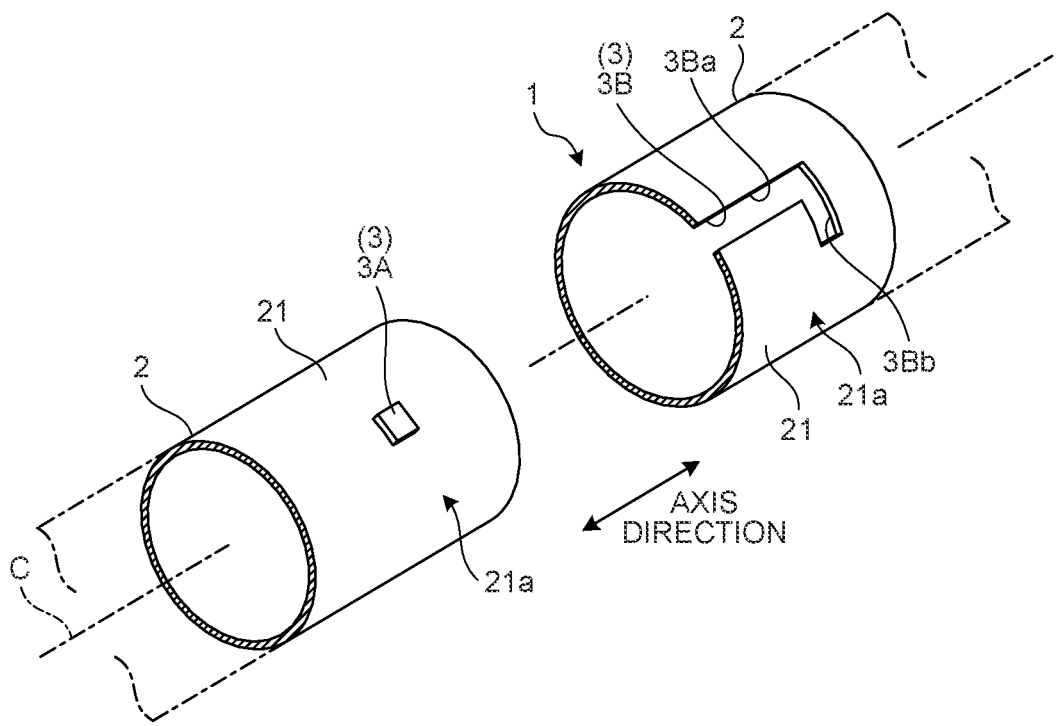
FIG. 2 is a perspective view of a sheathing member according to a first embodiment.
Figure 3:
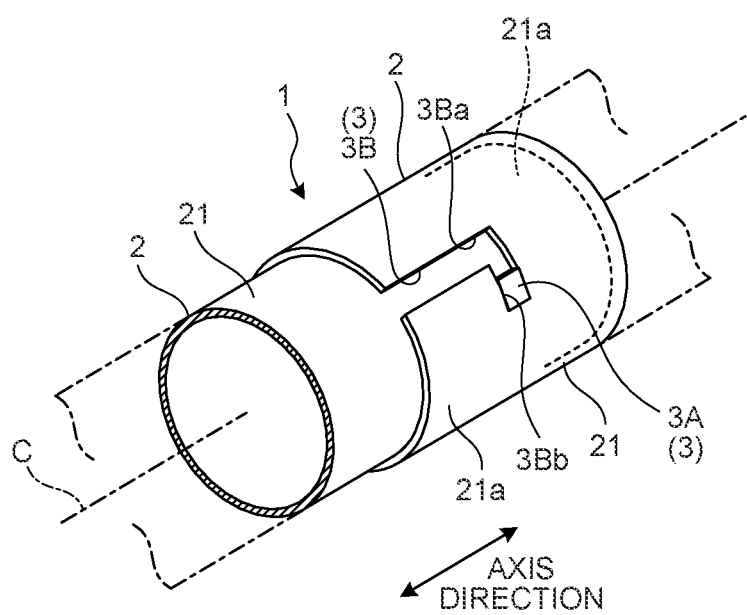
FIG. 3 is a perspective view of connection in the sheathing member according to the first embodiment.
Figure 4:
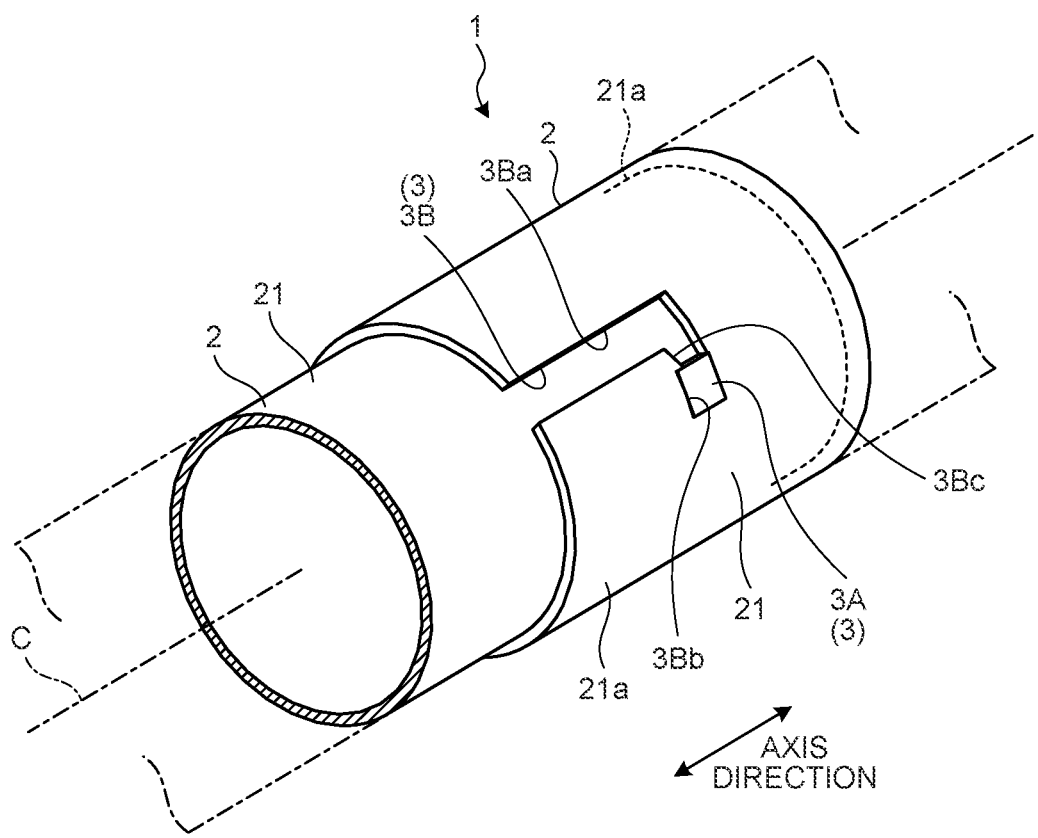
FIG. 4 is a perspective view of another example of the sheathing member according to the first embodiment.

FIGS. 2 to 4 illustrate a sheathing member 1 according to the first embodiment. The sheathing member 1 of the first embodiment includes a connecting unit 3 that connects respective open ends 21 of the tubular units 2 (2A, 2B) with each other. The tubular units 2 (2A, 2B) respectively include lap portions 21a in which the respective open ends 21 to be connected overlap each other along a diameter direction, and the connecting unit 3 is provided in each of the lap portions 21a.

The connecting unit 3 includes a projection 3A and a groove unit 3B. The projection 3A is provided in the lap portion 21a of one of the tubular units 2 (2A, 2B) to be connected and projects along a diameter direction (a direction across the tubular unit 2 (2A, 2B), crossing the central axis C). Meanwhile, the groove unit 3B guides the projection 3A to have the projection 3A passed therethrough and is provided in the lap portion 21a of the other of the tubular units 2 (2A, 2B) to be connected, as a slit cut through the lap portion 21a along a diameter direction. The groove unit 3B includes a first groove 3Ba extending from the open end in the lap portion 21a of the other of the tubular units 2 (2A, 2B) to be connected along an axis direction and a second groove 3Bb extending from an axially-extended innermost end of the first groove 3Ba along a circumference direction (direction around the central axis C).

In FIGS. 2 to 4, the lap portion 21a of the one of the tubular units 2 (2A, 2B) provided with the projection 3A overlaps the lap portion 21a of the other of the tubular units 2 (2A, 2B) provided with the groove unit 3B, on a diametrically inner side. Thus, the projection 3A provided in the inner one of the overlapping lap portions 21a is provided so as to project outward along a diameter direction (toward a side farther from the central axis C) from an outer surface of the lap portion 21a so that it is passed through the groove unit 3B provided as a slit in the outer one of the overlapping lap portions 21a.

Additionally, though not clearly illustrated in the drawings, the lap portion 21a of the one of the tubular units 2 (2A, 2B) provided with the projection 3A may be formed so as to overlap the lap portion 21a of the other of the tubular units 2 (2A, 2B) provided with the groove unit 3B, on a diametrically outer side. In this case, the projection 3A provided in the outer one of the overlapping lap portions 21a is provided so as to project inward along a diameter direction (toward a side closer to the central axis C) from an inner surface of the lap portion 21a so that it is passed through the groove unit 3B provided as a slit in the inner one of the overlapping lap portions 21a.

In the connecting unit 3, the projection 3A is passed through the first groove 3Ba of the groove unit 3B from the open end of the lap portion 21a when the one of the tubular units 2 (2A, 2B) is inserted into the other of the tubular units 2 (2A, 2B) along an axis direction so that the respective lap portions 21a of the tubular units 2 (2A, 2B) overlap each other. Then, when the one of the tubular units 2 (2A, 2B) and the other of the tubular units 2 (2A, 2B) are caused to move relative to each other along a circumference direction after the projection 3A is passed to an axially innermost end of the first groove 3Ba, the projection 3A is passed through the second groove 3Bb. When the projection 3A is passed to a circumferentially innermost end of the second groove 3Bb, the one of the tubular units 2 (2A, 2B) and the other of the tubular units 2 (2A, 2B) are connected. The connected tubular units 2 (2A, 2B) are restrained from moving away from each other along an axis direction by engagement of the second groove 3Bb and the projection 3A, and relative movement thereof along a circumference direction is limited to within a range defined by the second groove 3Bb.

In the connecting unit 3, the projection 3A is provided in the lap portion 21a at one end of a certain tubular unit 2 (2A, 2B) and the groove unit 3B is provided in the lap portion 21a at the other end of the certain tubular unit 2 (2A, 2B), which enables connection between the plurality of tubular units 2 (2A, 2B) having the same configuration. Alternatively, in the connecting unit 3, the projection 3A is provided in the lap portion 21a at each of both ends in one of the tubular units 2 (2A, 2B), and the groove unit 3B is provided in the lap portion 21a at each of both ends in the other of the tubular units 2 (2A, 2B), which enables connection between the one of tubular units 2 (2A, 2B) and the other of the tubular units 2 (2A, 2B). Further, the connecting unit 3 may be provided in each of plural places in the lap portion 21a along a circumference direction. The connecting units 3 in plural places are preferably provided so as to be equally spaced in the lap portion 21a along a circumference direction.

The tubular units 2 (2A, 2B) connected by the connecting unit 3 can be fixed by winding of a pressure-adhesive tape around the respective open ends 21 along a circumference direction.

Moreover, in the connecting unit 3, a locking unit 3Bc may be formed in an entrance of the second groove 3Bb where the direction of the groove unit 3B is changed from the direction along the first groove 3Ba to a circumference direction, as illustrated in FIG. 4. The locking unit 3Bc is formed so as to make an axial width of the second groove 3Bb narrower than an axial dimension of the projection 3A that is to be passed through the second groove 3Bb. Thus, the locking unit 3Bc is engaged with the projection 3A when the projection 3A is passed to a circumferentially innermost end of the second groove 3Bb, thereby restraining the projection 3A from moving through the second groove 3Bb along a circumference direction and reaching the first groove 3Ba. As a result of this, the connecting unit 3 can retain the projection 3A in the second groove 3Bb and keep connection between the tubular units 2 (2A, 2B). Additionally, though the projection 3A is illustrated as a projection in a shape of a rectangular prism in FIGS. 2 to 4, there is no limitation to the shape of the projection 3A as long as the projection 3A can be passed through the groove unit 3B and be engaged with the locking unit 3Bc.

As described above, the sheathing member 1 and the wire harness WH of the first embodiment include the plurality of tubular units 2 (2A, 2B) into each of which the wiring material W having conductivity is inserted, and the connecting unit 3 that connects the respective open ends 21 of the tubular units 2 (2A, 2B) with each other. The tubular units 2 (2A, 2B) respectively include the lap portions 21a in which the open ends 21 to be connected overlap each other along a diameter direction, and the connecting unit 3 includes the projection 3A that is provided in the lap portion 21a of one of the tubular units 2 (2A, 2B) to be connected and projects along a diameter direction and the groove unit 3B that is provided in the lap portion 21a of the other of the tubular units 2 (2A, 2B) to be connected, includes the first groove 3Ba extending from the open end along an axis direction and the second groove 3Bb extending from an axially-extended end of the first groove 3Ba along a circumference direction, and has the projection 3A passed therethrough.

Therefore, the sheathing member 1 and the wire harness WH of the first embodiment, in which the plurality of tubular units 2 (2A, 2B) are connected by the connecting unit 3, allows a change in length of a connected portion of the tubular unit 2 (2A, 2B) and a change in a kind of the tubular unit 2 (2A, 2B). As a result of this, the sheathing member 1 and the wire harness WH of the first embodiment can improve versatility for coping with various setting locations. Further, with the sheathing member 1 and the wire harness WH of the first embodiment, as compared to a case where many sheathing members in different forms are prepared, it is possible to reduce cost for management of manufacture, transportation, and the like by preparing the tubular units 2 (2A, 2B) each having a small length in a state ready for connection. Moreover, in the sheathing member 1 and the wire harness WH of the first embodiment, the connecting unit 3 includes the L-shaped groove unit 3B that includes the first groove 3Ba and the second groove 3Bb and has the projection 3A passed therethrough. Thus, in the sheathing member 1 and the wire harness WH of the first embodiment, the second groove 3Bb and the projection 3A are engaged, which restrains the connected tubular units 2 (2A, 2B) from moving away from each other along an axis direction and limits a range of relative movement of the connected tubular units 2 (2A, 2B) along a circumference direction. As a result of this, the sheathing member 1 and the wire harness WH of the first embodiment can easily connect the tubular units 2 (2A, 2B).

Further, in the sheathing member 1 and the wire harness WH of the first embodiment, the groove unit 3B of the connecting unit 3 is provided as a slit cut through the lap portion 21a of the other of the tubular units 2 (2A, 2B) to be connected.

With this configuration, the sheathing member 1 and the wire harness WH of the first embodiment can implement a configuration that can connect the tubular units 2 (2A, 2B) using a simple component.

Further, in the sheathing member 1 and the wire harness WH of the first embodiment, the connecting unit 3 includes the locking unit 3Bc that retains the projection 3A in the second groove 3Bb of the groove unit 3B.

With this configuration, the sheathing member 1 and the wire harness WH of the first embodiment can surely connect the tubular units 2 (2A, 2B).

Further, in the sheathing member 1 and the wire harness WH of the first embodiment, the connecting unit 3 is provided in each of plural places of the lap portion 21a along a circumference direction.

With this configuration, the sheathing member 1 and the wire harness WH of the first embodiment, in which the connecting unit 3 is provided in each of plural places along a circumference direction, can stably connect the tubular units 2 (2A, 2B). Moreover, in the sheathing member 1 and the wire harness WH of the first embodiment, by providing the connecting units 3 having the same configuration so that they are equally spaced along a circumference direction, it is possible to achieve connection while shifting a connection place along a circumference direction, thereby changing movement along a circumference direction.

Further, in the sheathing member 1 and the wire harness WH of the first embodiment, the plurality of tubular units 2 (2A, 2B) include the path-restricting tubular unit 2A that has higher stiffness than that of the wiring material W (bundle of the wiring materials W) and restricts a wiring path of the wiring material W (bundle of the wiring materials W), and the deformation-allowing tubular unit 2B that has greater flexibility than the path-restricting tubular unit 2A and allows deformation of the wiring material W.

With this configuration, when the path-restricting tubular unit 2A and the deformation-allowing tubular unit 2B are combined and connected, the sheathing member 1 and the wire harness WH of the first embodiment can restrict a wiring path of the wiring material W (bundle of the wiring materials W) using the path-restricting tubular unit 2A in part, thereby keeping a shape in accordance with the wiring path. Meanwhile, when the path-restricting tubular unit 2A and the deformation-allowing tubular unit 2B are combined and connected, the sheathing member 1 and the wire harness WH of the first embodiment can allow deformation of the wiring material W (bundle of the wiring materials W) using the deformation-allowing tubular unit 2B in part, thereby flexibly coping with a change or fine adjustment of a wiring path. As a result of this, the sheathing member 1 and the wire harness WH of the first embodiment can be put to various uses. In other words, the sheathing member 1 and the wire harness WH of the first embodiment can achieve compatibility between a function of keeping a shape of a wiring path of the wiring material W (bundle of the wiring materials W) and a function of making the shape of a wiring path changeable. To put it another way, in the sheathing member 1 and the wire harness WH of the first embodiment, by appropriately combining the path-restricting tubular unit 2A and the deformation-allowing tubular unit 2B, it is possible to achieve proper balance between flexibility and stiffness that are required differently by respective portions, thereby ensuring excellent operability in wiring and excellent handleability. As a result, the sheathing member 1 and the wire harness WH of the first embodiment can improve operability in wiring of the wiring material W (bundle of the wiring materials W) and improve mountability.

Second Embodiment

FIGS. 5 to 8 illustrate a sheathing member 201 according to the second embodiment. It is noted that, in the following description, duplicated description of the same components, effects, advantages as those in the above-described embodiment is omitted as much as possible (this holds true for subsequent embodiments). The sheathing member 201 of the second embodiment is different from that of the above-described first embodiment in inclusion of a connecting unit 203 in place of the connecting unit 3 of the first embodiment. The other components of the sheathing member 201 of the second embodiment are substantially the same as those in the above-described first embodiment. The sheathing member 201 of the second embodiment includes the connecting unit 203 that connects open ends 21 of tubular units 2 (2A, 2B) with each other. The tubular units 2 (2A, 2B) respectively include lap portions 21a in which the open ends 21 to be connected overlap each other along a diameter direction, and the connecting unit 203 is provided in each of the lap portions 21a.

The connecting unit 203 includes a projection 203A and a groove unit 203B. The projection 203A is provided in the lap portion 21a of one of the tubular units 2 (2A, 2B) to be connected and projects along a diameter direction (a direction across the tubular unit 2 (2A, 2B), crossing a central axis C). Meanwhile, the groove unit 203B guides the projection 203A to have the projection 203A passed therethrough, and is provided in the lap portion 21a of the other of the tubular units 2 (2A, 2B) to be connected, as a recessed groove that is formed so as to open to a diametrically inner side (side closer to the central axis C) within a thickness of the lap portion 21a. The groove unit 203B includes a first groove 203Ba extending from the open end of the lap portion 21a of the other of the tubular units 2 (2A, 2B) to be connected along an axis direction and a second groove 203Bb extending from an axially-extended innermost end of the first groove 203Ba along a circumferential direction (direction around the central axis C). Additionally, though the projection 203A is illustrated as a projection in a shape of a rectangular prism in FIGS. 5, 7, and 8, there is no limitation to the shape of the projection 203A as long as the projection 203A can be passed through the groove unit 203B.

In FIGS. 5 to 8, the lap portion 21a of the one of the tubular units 2 (2A, 2B) provided with the projection 203A overlaps the lap portion 21a of the other of the tubular units 2 (2A, 2B) provided with the groove unit 203B, on a diametrically inner side. Thus, the projection 203A provided in the inner one of the overlapping lap portions 21a is provided so as to project outward along a diameter direction (toward a side farther from the central axis C) from an outer surface of the lap portion 21a so that it is passed through the groove unit 203B provided as a recessed groove in the outer one of the overlapping lap portions 21a.

Additionally, though not clearly illustrated in the drawings, the lap portion 21a of the one of the tubular units 2 (2A, 2B) provided with the projection 203A may be formed so as to overlap the lap portion 21a of the other of the tubular units 2 (2A, 2B) provided with the groove unit 203B, on a diametrically outer side. In this case, the projection 203A provided in the outer one of the overlapping lap portions 21a is provided so as to project inward along a diameter direction from an inner surface of the lap portion 21a so that it is passed through the groove unit 203B provided as a recessed groove that is formed so as to open to a diametrically outer side within a thickness of the inner one of the overlapping lap portions 21a.

In the connecting unit 203, the projection 203A is passed through the first groove 203Ba of the groove unit 203B from the open end of the lap portion 21a when the one of the tubular units 2 (2A, 2B) is inserted into the other of the tubular units 2 (2A, 2B) along an axis direction so that the respective lap portions 21a of the tubular units 2 (2A, 2B) overlap each other. Then, when the one of the tubular units 2 (2A, 2B) and the other of the tubular units 2 (2A, 2B) are caused to move relative to each other along a circumference direction after the projection 203A is passed to an axially innermost end of the first groove 203Ba, the projection 203A is passed through the second groove 203Bb. When the projection 203A is passed to a circumferentially innermost end of the second groove 203Bb, the one of the tubular units 2 (2A, 2B) and the other of the tubular units 2 (2A, 2B) are connected. The connected tubular units 2 (2A, 2B) are restrained from moving away from each other along an axis direction by engagement of the second groove 203Bb and the projection 203A, and relative movement thereof along a circumference direction is limited to within a range defined by the second groove 203Bb.

In the connecting unit 203, the projection 203A is provided in the lap portion 21a at one end of a certain tubular unit 2 (2A, 2B) and the groove unit 203B is provided in the lap portion 21a at the other end of the certain tubular unit 2 (2A, 2B), which enables connection between the plurality of tubular units 2 (2A, 2B) having the same configuration.

Alternatively, in the connecting unit 203, the projection 203A is provided in the lap portion 21a at each of both ends in one of the tubular units 2 (2A, 2B), and the groove unit 203B is provided in the lap portion 21a at each of both ends in the other of the tubular units 2 (2A, 2B), which enables connection between the one of tubular units 2 (2A, 2B) and the other of the tubular units 2 (2A, 2B). Further, the connecting unit 203 may be provided in each of plural places in the lap portion 21a along a circumference direction. The connecting units 203 in plural places are preferably provided so as to be equally spaced along a circumference direction in the lap portion 21a.

The tubular units 2 (2A, 2B) connected by the connecting unit 203 can be fixed by winding of a pressure-adhesive tape around the respective open ends 21 along a circumference direction.

Figure 5:
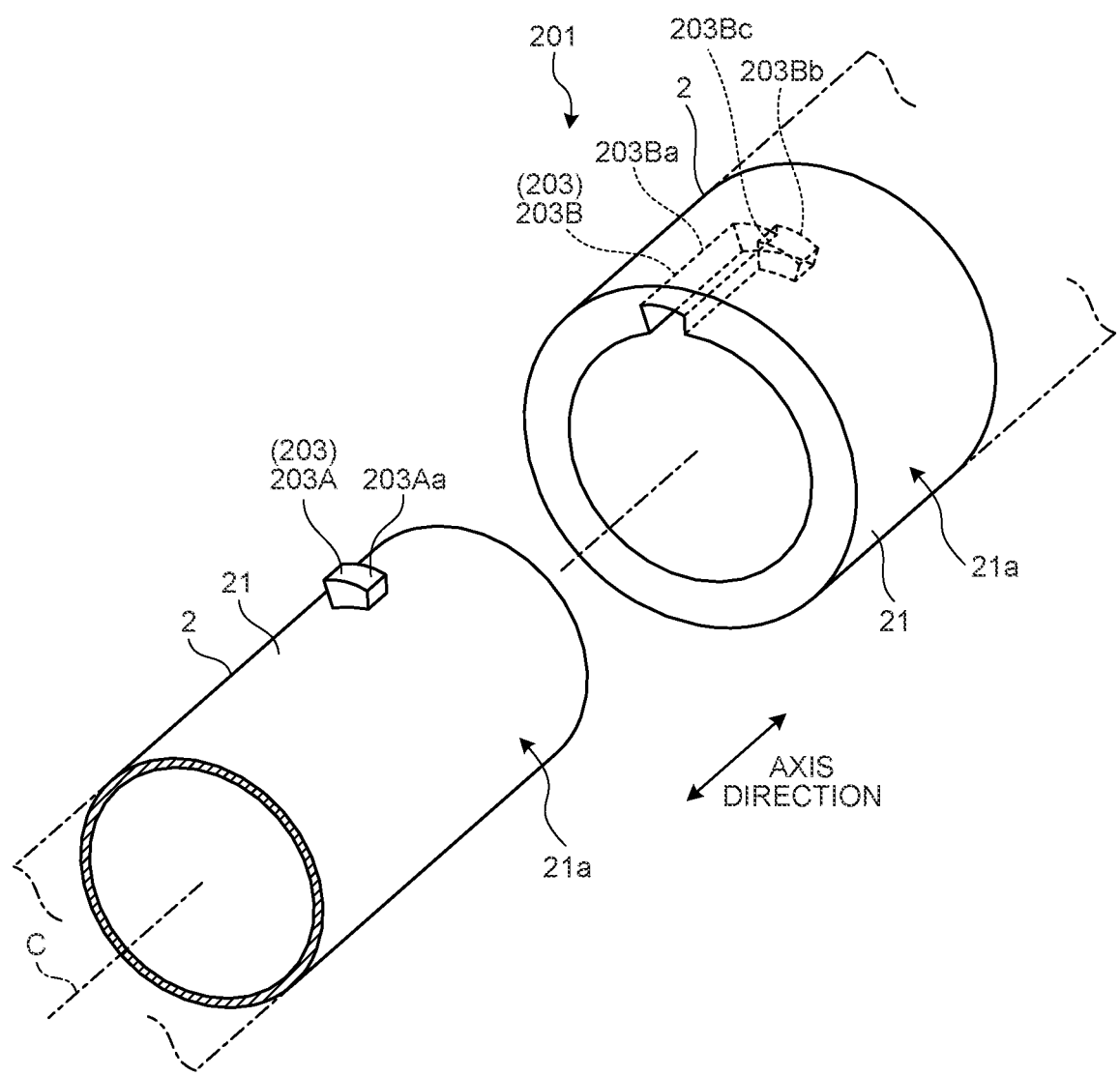
FIG. 5 is a perspective view of a sheathing member according to a second embodiment.
Figure 6:
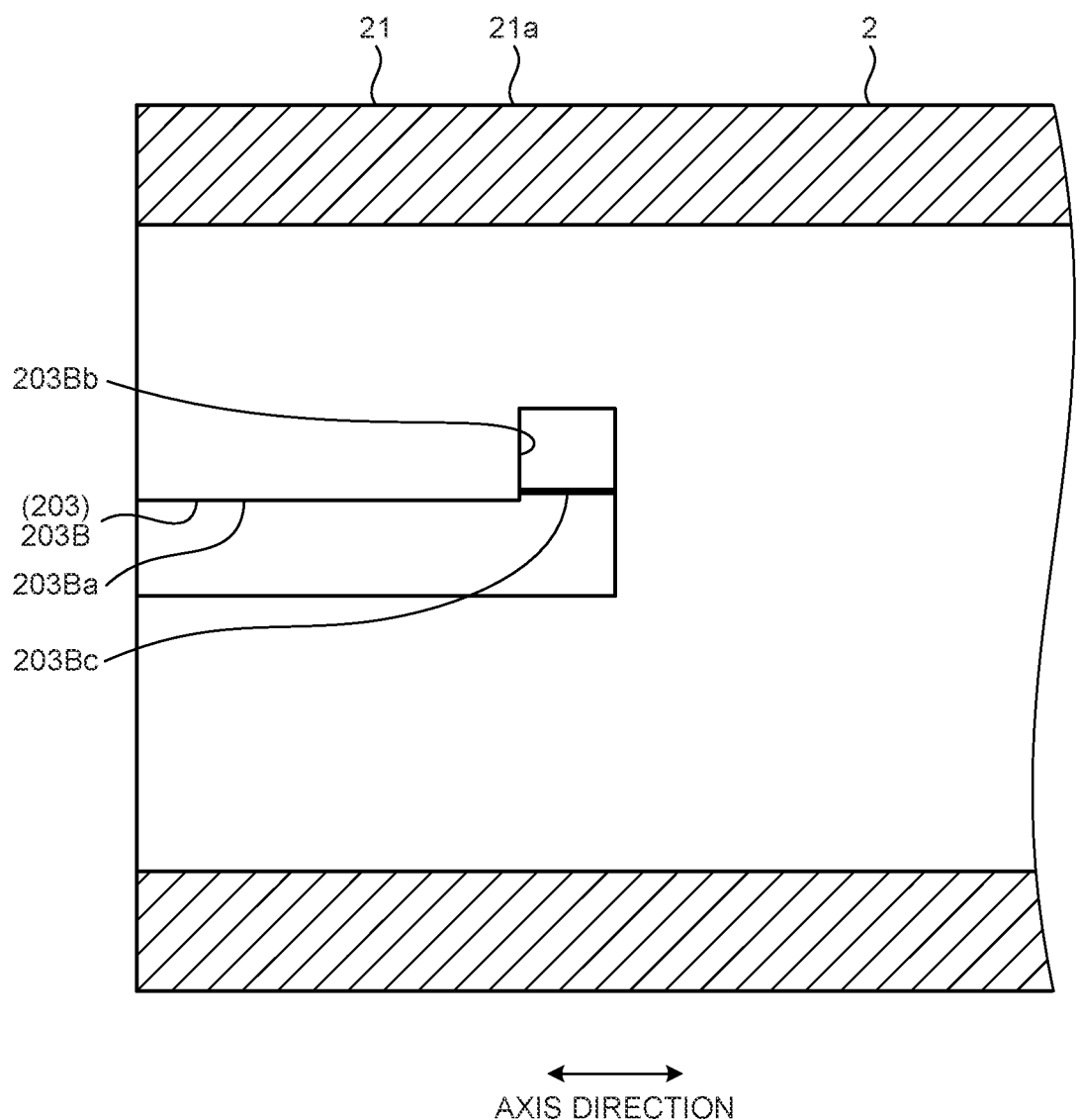
FIG. 6 is a sectional view illustrating a connecting unit of the sheathing member according to the second embodiment.
Figure 7:
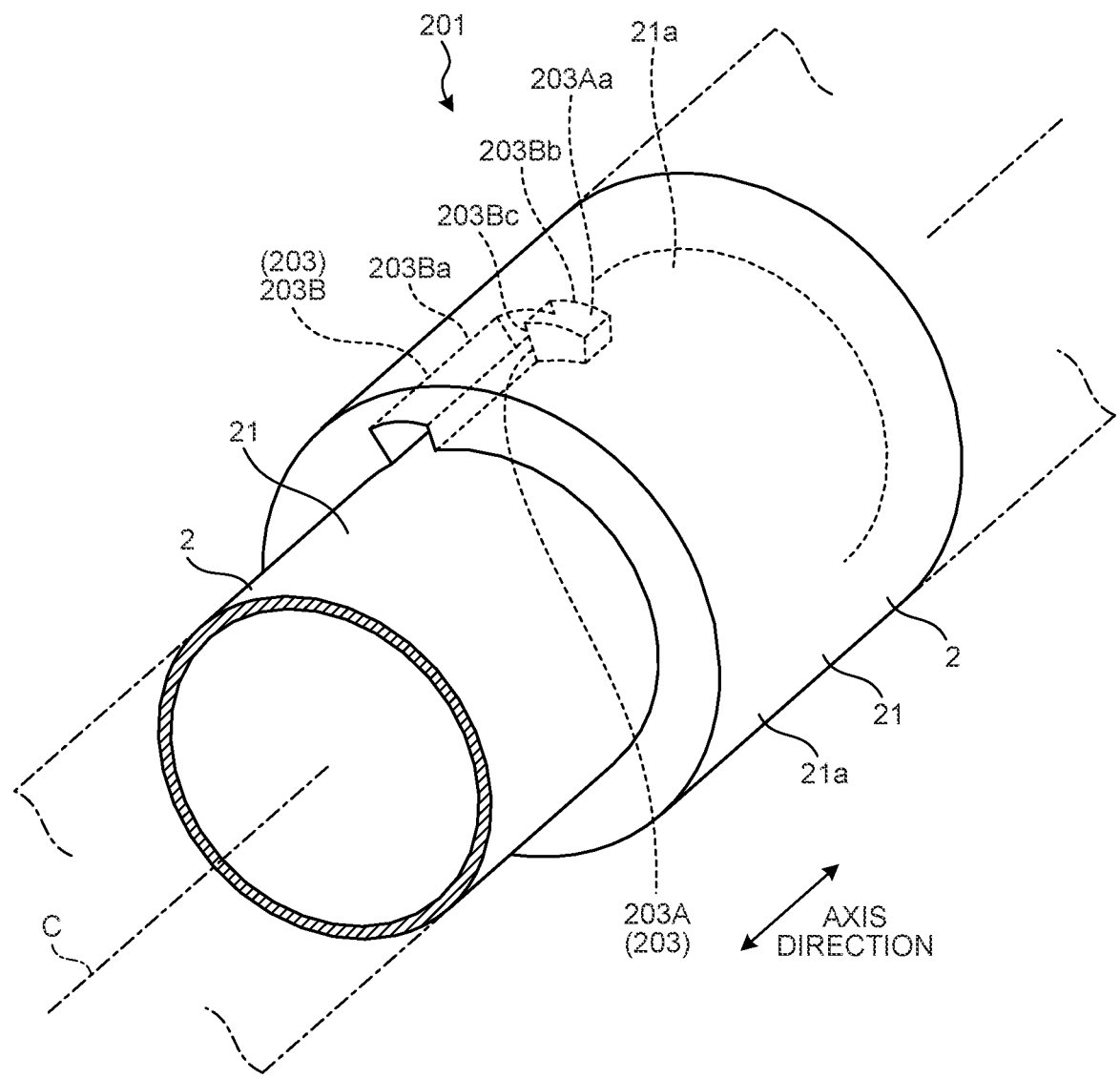
FIG. 7 is a perspective view of connection in the sheathing member according to the second embodiment.
Figure 8:
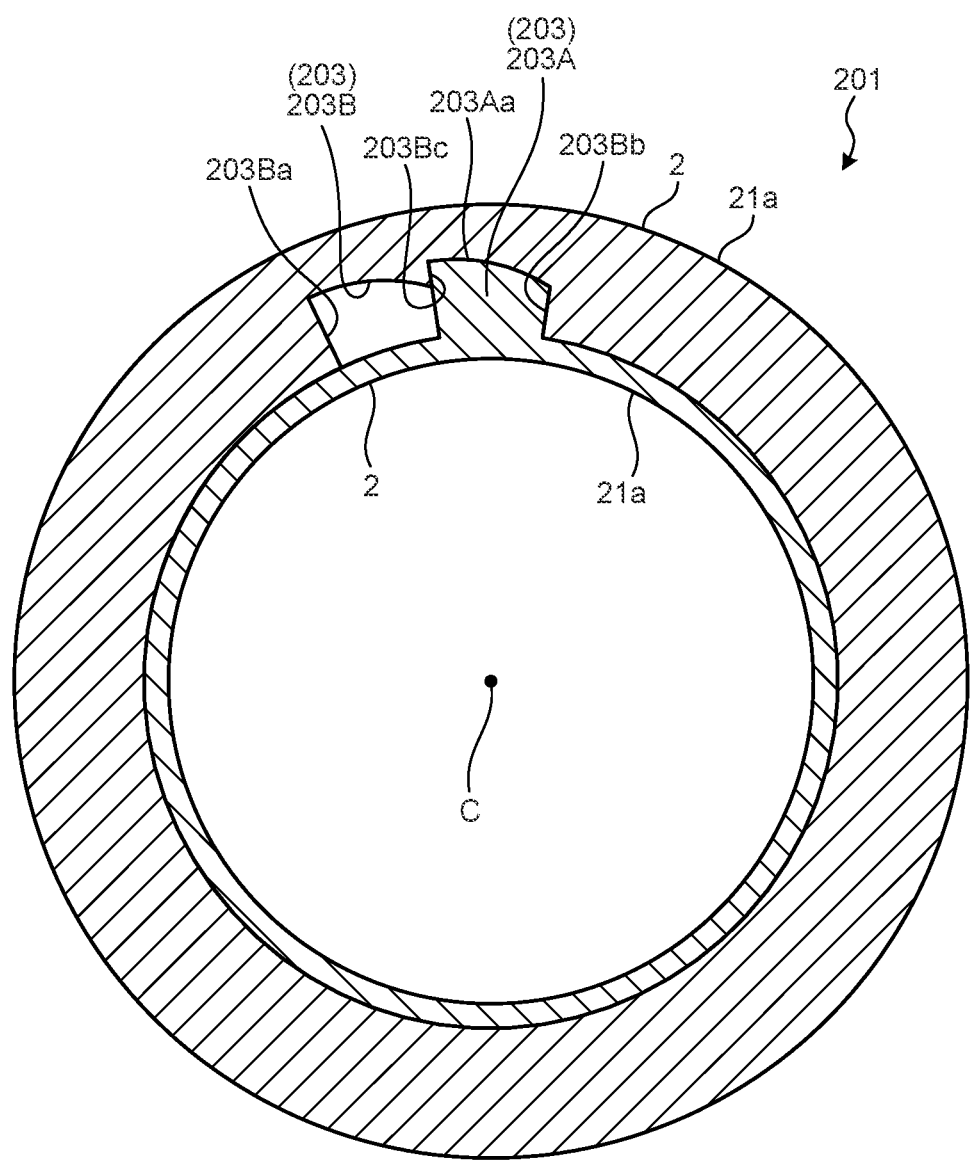
FIG. 8 is a sectional view of the connection in the sheathing member according to the second embodiment.

Moreover, in the connecting unit 203, a locking unit 203Bc is formed in an entrance of the second groove 203Bb where the direction of the groove unit 203B is changed from the direction along the first groove 203Ba to a circumference direction. The locking unit 203Bc is formed so as to make a diametrical depth of the second groove 203Bb shallower than a diametrical dimension of the projection 203A that is to be passed through the second groove 203Bb. Thus, as illustrated in FIG. 8, when the projection 203A is passed to a circumferentially innermost end of the second groove 203Bb, the locking unit 203Bc restrains the projection 203A from moving through the second groove 203Bb along a circumference direction and reaching the first groove 203Ba. As a result of this, the connecting unit 203 can retain the projection 203A in the second groove 203Bb and keep connection between the tubular units 2 (2A, 2B). Additionally, as illustrated in FIGS. 5, 7, and 8, in the projection 203A, a projecting end 203Aa is formed in a shape of an arc along a circumference direction, and a groove bottom of the second groove 203Bb also is formed in a shape of an arc along a circumference direction in accordance with the projecting end 203Aa. This allows the projecting end 203Aa and the groove bottom to be fitted to each other while the projection 203A is being engaged with the locking unit 203Bc. Thus, the connecting unit 203 can surely retain the projection 203A in the second groove 203Bb.

The sheathing member 201 and the wire harness WH of the second embodiment can improve versatility for coping with various setting locations in the same manner as in the first embodiment.

Moreover, in the sheathing member 201 and the wire harness WH of the second embodiment, the groove unit 203B of the connecting unit 203 is provided as a recessed groove that is formed within a thickness of the lap portion 21a of the other of the tubular units 2 (2A, 2B) to be connected.

With this configuration, the sheathing member 201 and the wire harness WH of the second embodiment can implement a configuration that can connect the tubular units 2 (2A, 2B) with a simple component. Further, in the sheathing member 201 and the wire harness WH of the second embodiment, the lap portion 21a of the other of tubular units 2 (2A, 2B) provided with the groove unit 203B can be formed so as to have a large thickness, thereby improving strength.

Third Embodiment

FIGS. 9 to 12 illustrate a sheathing member 301 according to the third embodiment. The sheathing member 301 of the third embodiment is different from that of the above-described first embodiment in inclusion of a connecting unit 303 in place of the connecting unit 3 of the first embodiment. The other components of the sheathing member 301 of the third embodiment are substantially the same as those in the above-described first embodiment. The sheathing member 301 of the third embodiment includes the connecting unit 303 that connects open ends 21 of tubular units 2 (2A, 2B) with each other. The tubular units 2 (2A, 2B) respectively include lap portions 21a in which the open ends 21 to be connected overlap each other along a diameter direction, and the connecting unit 303 is provided in each of the lap portions 21a.

The connecting unit 303 includes a projection 303A and a groove unit 303B. The projection 303A is provided in the lap portion 21a of one of the tubular units 2 (2A, 2B) to be connected and projects along a diameter direction (a direction across the tubular unit 2 (2A, 2B), crossing a central axis C). Meanwhile, the groove unit 303B guides the projection 303A to have the projection 303A passed therethrough, and is provided in the lap portion 21a of the other of the tubular units 2 (2A, 2B) to be connected, as a projecting groove that is formed so as to open to a diametrically inner side (side closer to the central axis C) in a projecting portion 21b that is formed so as to project outward along a diameter direction (toward a side farther from the central axis C). The groove unit 303B includes a first groove 303Ba extending from the open end of the lap portion 21a of the other of the tubular units 2 (2A, 2B) to be connected along an axis direction and a second groove 303Bb extending from an axially-extended innermost end of the first groove 303Ba along a circumferential direction (direction around the central axis C). Additionally, though the projection 303A is illustrated as a projection in a shape of a rectangular prism in FIGS. 9, 11, and 12, there is no limitation to the shape of the projection 303A as long as the projection 303A can be passed through the groove unit 303B.

In FIGS. 9 to 12, the lap portion 21a of the one of the tubular units 2 (2A, 2B) provided with the projection 303A overlaps the lap portion 21a of the other of the tubular units 2 (2A, 2B) provided with the groove unit 303B, on a diametrically inner side. Thus, the projection 303A provided in the inner one of the overlapping lap portions 21a is provided so as to project outward along a diameter direction from an outer surface of the lap portion 21a so that it is passed through the groove unit 303B provided as a projecting groove in the outer one of the overlapping lap portions 21a.

Additionally, though not clearly illustrated in the drawings, the lap portion 21a of the one of the tubular units 2 (2A, 2B) provided with the projection 303A may be formed so as to overlap the lap portion 21a of the other of the tubular units 2 (2A, 2B) provided with the groove unit 303B, on a diametrically outer side. In this case, the projection 303A provided in the outer one of the overlapping lap portions 21a is provided so as to project inward along a diameter direction from an inner surface of the lap portion 21a so that it is passed through the groove unit 303B provided as a projecting groove that is formed so as to open to a diametrically outer side in a projecting portion formed so as to project inward along a diameter direction in the inner one of the overlapping lap portions 21a.

In the connecting unit 303, the projection 303A is passed through the first groove 303Ba of the groove unit 303B from the open end of the lap portion 21a when the one of the tubular units 2 (2A, 2B) is inserted into the other of the tubular units 2 (2A, 2B) along an axis direction so that the respective lap portions 21a overlap each other. Then, when the one of the tubular units 2 (2A, 2B) and the other of the tubular units 2 (2A, 2B) are caused to move relative to each other along a circumference direction after the projection 303A is passed to an axially innermost end of the first groove 303Ba, the projection 303A is passed through the second groove 303Bb. When the projection 303A is passed to a circumferentially innermost end of the second groove 303Bb, the one of the tubular units 2 (2A, 2B) and the other of the tubular units 2 (2A, 2B) are connected. The connected tubular units 2 (2A, 2B) are restrained from moving away from each other along an axis direction by engagement of the second groove 303Bb and the projection 303A, and relative movement thereof along a circumference direction is limited to within a range defined by the second groove 303Bb.

In the connecting unit 303, the projection 303A is provided in the lap portion 21a at one end of a certain tubular unit 2 (2A, 2B) and the groove unit 303B is provided in the lap portion 21a at the other end of the certain tubular unit 2 (2A, 2B), which enables connection between the plurality of tubular units 2 (2A, 2B) having the same configuration. Alternatively, in the connecting unit 303, the projection 303A is provided in the lap portion 21a at each of both ends in one of the tubular units 2 (2A, 2B), and the groove unit 303B is provided in the lap portion 21a at each of both ends in the other of the tubular units 2 (2A, 2B), which enables connection between the one of tubular units 2 (2A, 2B) and the other of the tubular units 2 (2A, 2B). Further, the connecting unit 303 may be provided in each of plural places in the lap portion 21a along a circumference direction. The connecting units 303 in plural places are preferably provided so as to be equally spaced along a circumference direction in the lap portion 21a.

The tubular units 2 (2A, 2B) connected by the connecting unit 303 can be fixed by winding of a pressure-adhesive tape around the respective open ends 21 along a circumference direction.

Figure 9:
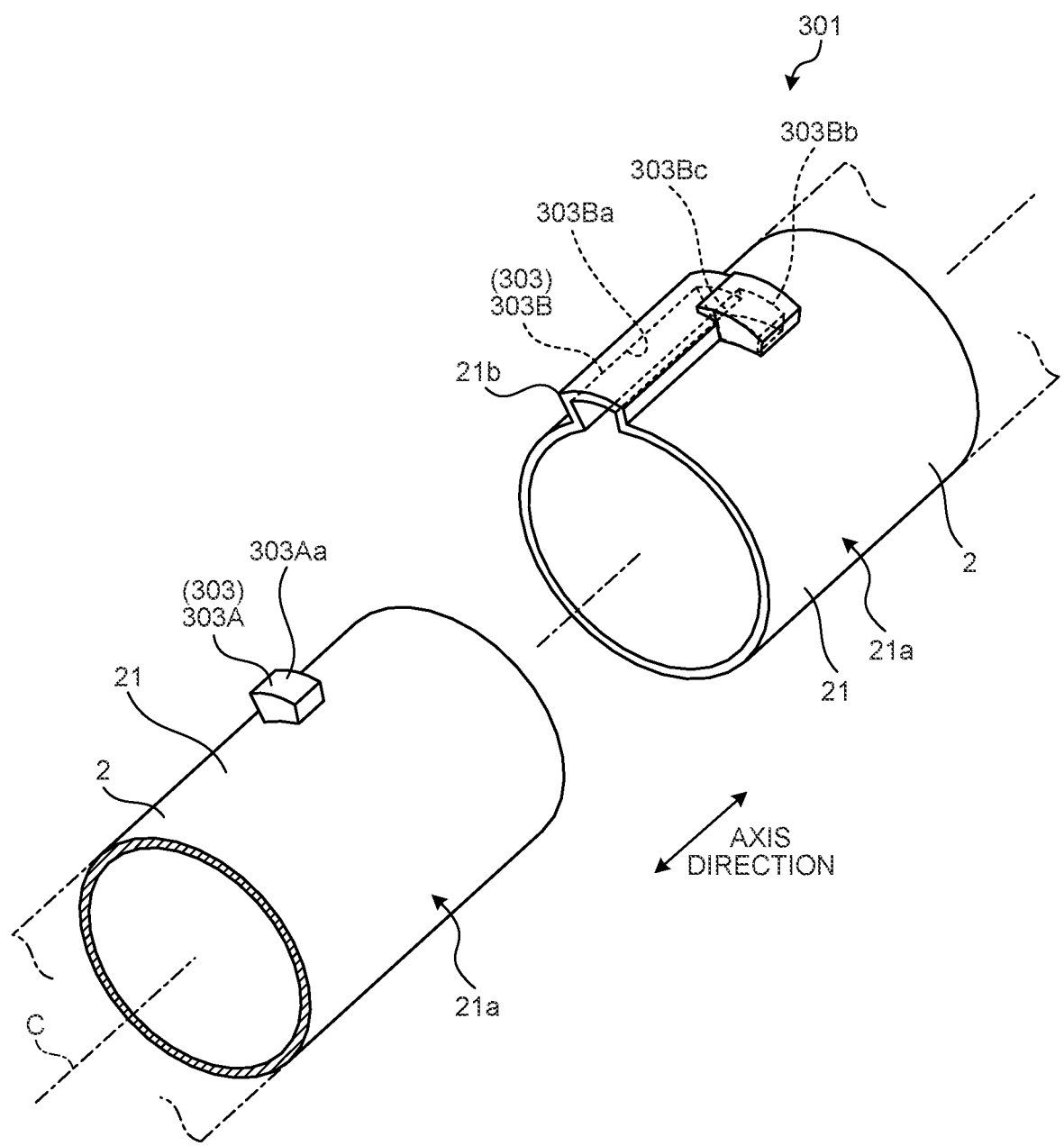
FIG. 9 is a perspective view of a sheathing member according to a third embodiment.
Figure 10:
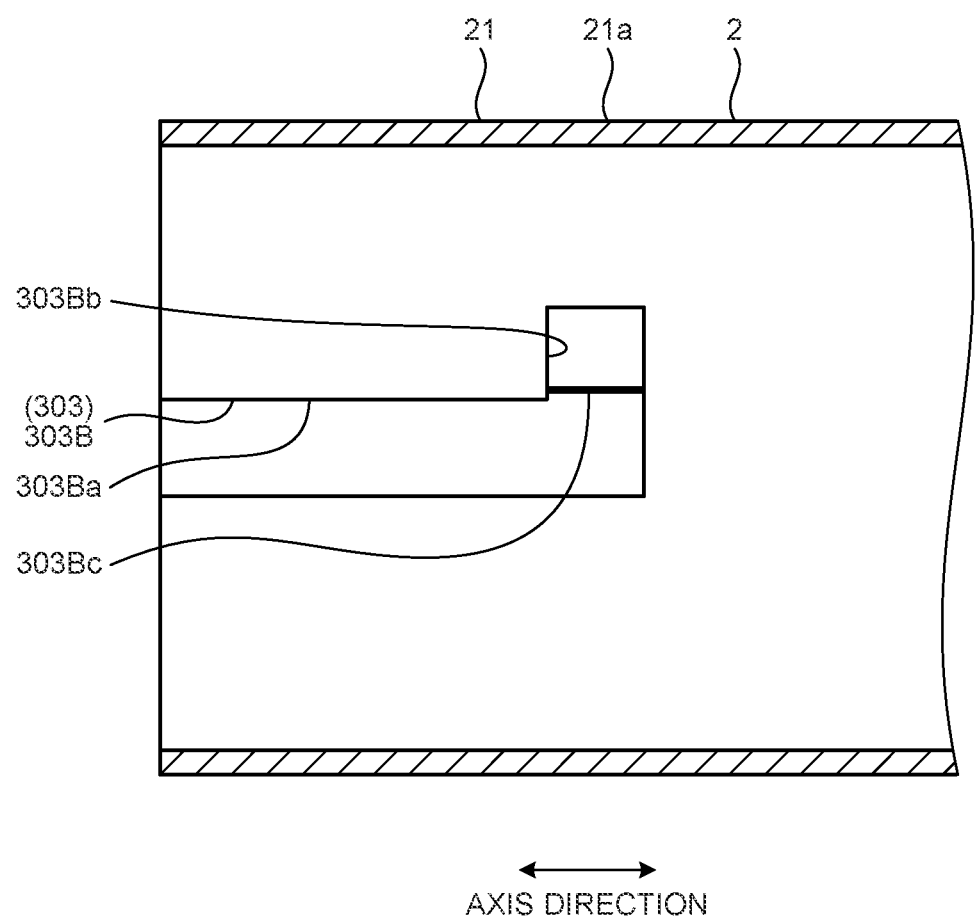
FIG. 10 is a sectional view illustrating a connecting unit of the sheathing member according to the third embodiment.
Figure 11:
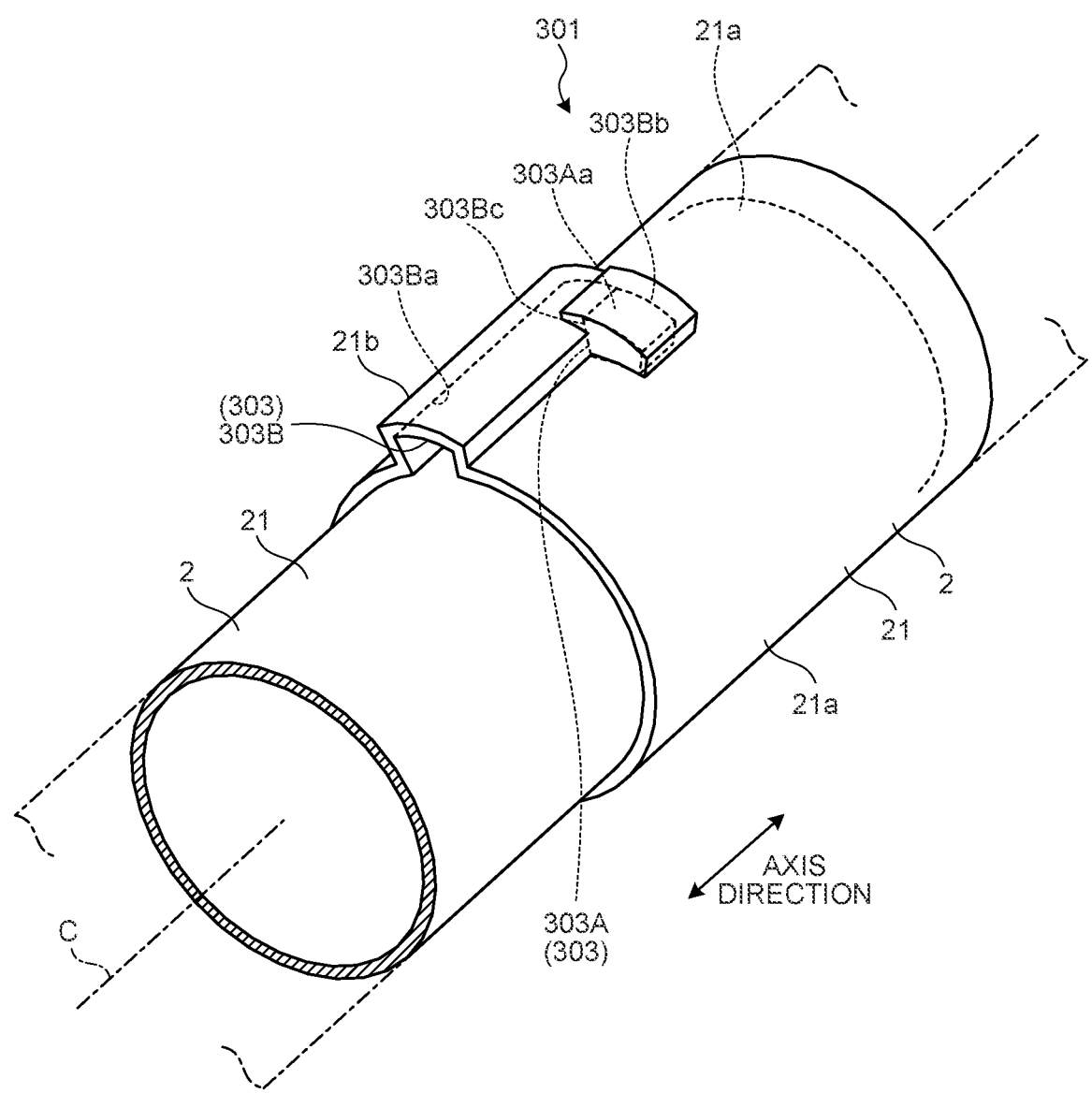
FIG. 11 is a perspective view of connection in the sheathing member according to the third embodiment.
Figure 12:
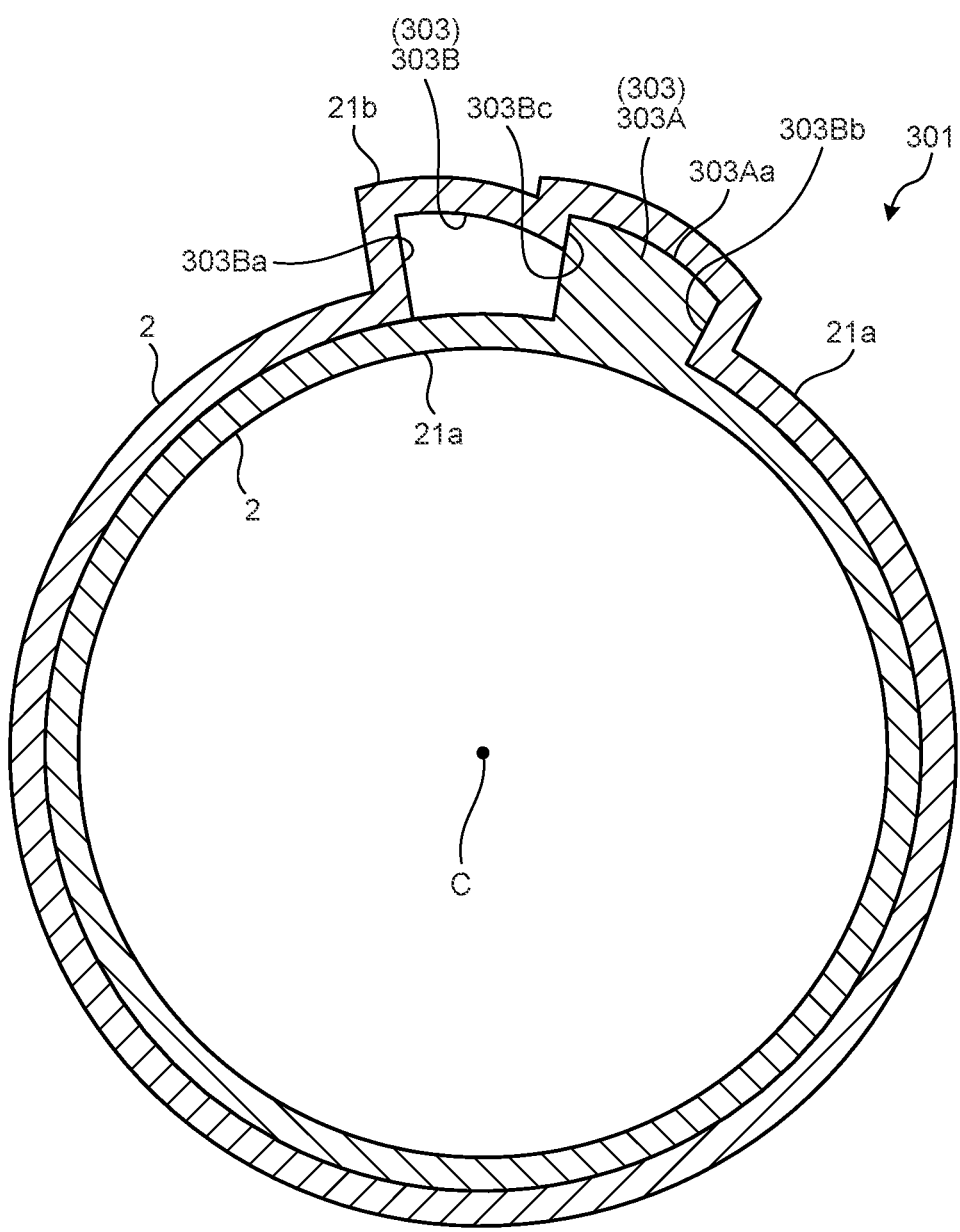
FIG. 12 is a sectional view of the connection in the sheathing member according to the third embodiment.

Moreover, in the connecting unit 303, a locking unit 303Bc is be formed in an entrance of the second groove 303Bb where the direction of the groove unit 303B is changed from the direction along the first groove 303Ba to a circumference direction. The locking unit 303Bc is formed so as to make a diametrical depth of the second groove 303Bb shallower than a diametrical dimension of the projection 303A that is to be passed through the second groove 303Bb. Thus, as illustrated in FIG. 12, when the projection 303A is passed to a circumferentially innermost end of the second groove 303Bb, the locking unit 303Bc restrains the projection 303A from moving through the second groove 303Bb along a circumference direction and reaching the first groove 303Ba. As a result of this, the connecting unit 303 can retain the projection 303A in the second groove 303Bb and keep connection between the tubular units 2 (2A, 2B). Additionally, as illustrated in FIGS. 9, 11, and 12, in the projection 303A, a projecting end 303Aa is formed in a shape of an arc along a circumference direction, and a groove bottom of the second groove 303Bb also is formed in a shape of an arc along a circumference direction in accordance with the projecting end 303Aa. This allows the projecting end 303Aa and the groove bottom to be fitted to each other while the projection 303A is being engaged with the locking unit 303Bc. Thus, the connecting unit 303 can surely retain the projection 303A in the second groove 303Bb.

The sheathing member 301 and the wire harness WH of the third embodiment can improve versatility for coping with various setting locations in the same manner as in the first embodiment.

Moreover, in the sheathing member 301 and the wire harness WH of the third embodiment, the groove unit 303B of the connecting unit 303 is provided as a projecting groove formed in a portion projecting along a diameter direction in the lap portion 21a of the other of the tubular units 2 (2A, 2B) to be connected.

With this configuration, the sheathing member 301 and the wire harness WH of the third embodiment can implement a configuration that can connect the tubular units 2 (2A, 2B) with a simple component. Further, in the sheathing member 301 and the wire harness WH of the third embodiment, the lap portion 21a of the other of tubular units 2 (2A, 2B) provided with the groove unit 303B can be formed so as to have the same thickness as that of the lap portion 21a of the one of the tubular units 2 (2A, 2B), thereby reducing an amount of materials to be used.

The sheathing member and the wire harness of the present embodiment, in which the plurality of tubular units are connected by the connecting unit, allows a change in a length of a connected portion of a tubular unit or a change in a kind of tubular unit. As a result of this, the sheathing member and the wire harness of the present embodiment can improve versatility for coping with various setting locations. Further, with the sheathing member and the wire harness of the present embodiment, as compared to a case where many sheathing members in different forms are prepared, it is possible to reduce cost for management of manufacture, transportation, and the like by preparing the tubular units each having a small length in a state ready for connection. Moreover, in the sheathing member and the wire harness of the present embodiment, the connecting unit includes the groove unit that includes the first groove and the second groove and has the projection passed therethrough. Thus, in the sheathing member and the wire harness of the present embodiment, the second groove and the projection are engaged, which restrains the connected tubular units from moving away from each other along an axis direction and limits a range of relative movement of the connected tubular units along a circumference direction. As a result of this, the sheathing member and the wire harness of the present embodiment can easily connect the tubular units.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sheathing member comprising:
a plurality of tubular units into each of which a wiring material having conductivity is inserted; and
a connecting unit configured to connect respective open ends of the tubular units with each other, wherein
the tubular units respectively include lap portions in which the open ends to be connected overlap each other along a diameter direction,
the connecting unit includes a projection that is provided in the lap portion of one of the tubular units to be connected and projects along the diameter direction, and a groove unit through which the projection is passed, the groove unit being provided in the lap portion of the other of the tubular units to be connected and including a first groove extending from the open end along an axis direction and a second groove extending from an axially-extended end of the first groove along a circumference direction,
the groove unit of the connecting unit is provided as a projecting groove that is formed in a portion projecting along the diameter direction in the lap portion of the other of the tubular units to be connected,
the connecting unit further includes a locking unit that retains the projection in the second groove of the groove unit, and
a projecting end is configured to form in a shape of an arc along a circumference direction, and a groove bottom of the second groove also is configured to form in a shape of an arc along a circumference direction in accordance with the projecting end.

2. The sheathing member according to claim 1, wherein the connecting unit is provided in each of plural places along a circumference direction in the lap portion.

3. The sheathing member according to claim 1, wherein the plurality of tubular units include a path-restricting tubular unit that has higher stiffness than that of the wiring material and restricts a wiring path of the wiring material, and a deformation-allowing tubular unit that has greater flexibility than the path-restricting tubular unit and allows deformation of the wiring material.

4. A wire harness comprising:
a wiring material having conductivity; and
a sheathing member with which the wiring material is sheathed, wherein
the sheathing member includes:
a plurality of tubular units into each of which the wiring material is inserted; and
a connecting unit configured to connect respective open ends of the plurality of tubular units with each other,
the tubular units respectively include lap portions in which the open ends to be connected overlap each other along a diameter direction, and
the connecting unit includes a projection that is provided in the lap portion of one of the tubular units to be connected and projects along the diameter direction, and a groove unit through which the projection is passed, the groove unit being provided in the lap portion of the other of the tubular units to be connected and including a first groove extending from the open end along an axis direction and a second groove extending from an axially-extended end of the first groove along a circumference direction,
the groove unit of the connecting unit is provided as a projecting groove that is formed in a portion projecting along the diameter direction in the lap portion of the other of the tubular units to be connected,
the connecting unit further includes a locking unit that retains the projection in the second groove of the groove unit, and
a projecting end is configured to form in a shape of an arc along a circumference direction, and a groove bottom of the second groove also is configured to form in a shape of an arc along a circumference direction in accordance with the projecting end.

* * * * *